US006194528B1

(12) United States Patent
Debras

(10) Patent No.: US 6,194,528 B1
(45) Date of Patent: Feb. 27, 2001

(54) PRODUCTION OF POLYETHYLENE HAVING IMPACT RESISTANCE

(75) Inventor: Guy Debras, Frasnes-lez-Gosselies (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/020,936

(22) Filed: Feb. 9, 1998

(30) Foreign Application Priority Data

Feb. 7, 1997 (EP) .................................................. 97101975

(51) Int. Cl.$^7$ ........................................................ C08F 4/22
(52) U.S. Cl. .................... 526/106; 526/107; 526/130; 502/242; 502/256
(58) Field of Search ..................... 526/130, 106, 526/107; 502/242, 256, 319

(56) References Cited

U.S. PATENT DOCUMENTS

| 4,151,122 | * | 4/1979 | McDaniel et al. | 252/458 |
| 4,180,481 | * | 12/1979 | Schulze | 252/441 |
| 4,297,460 | * | 10/1981 | McDaniel et al. | 526/98 |
| 4,405,768 | * | 9/1983 | McDaniel | 526/96 |
| 4,454,293 | * | 6/1984 | McDaniel | 526/106 |
| 4,820,785 | * | 4/1989 | McDaniel et al. | 526/105 |
| 4,966,951 | * | 10/1990 | Benham et al. | 526/106 |
| 5,208,309 | * | 5/1993 | McDaniel et al. | 526/348.2 |
| 5,641,842 | * | 6/1997 | McDaniel et al. | 526/96 |

FOREIGN PATENT DOCUMENTS 0000751   7/1978  (EP) .

* cited by examiner

Primary Examiner—David W. Wu
Assistant Examiner—R. Rabago
(74) Attorney, Agent, or Firm—Jim Wheelington

(57) ABSTRACT

A process for producing polyethylene having impact resistance, the process comprising polymerizing ethylene, or copolymerizing ethylene and an alpha-olefinic comonomer comprising from 3 to 10 carbon atoms, in the presence of a chemically reduced chromium-based catalyst containing in a support thereof from 2 to 3 wt % of titanium, based on the weight of the catalyst. The invention also provides a chromium-based catalyst for the production of polyethylene by polymerizing ethylene or copolymerizing ethylene and an alpha-olefinic comonomer comprising from 3 to 10 carbon atoms, the catalyst being chemically reduced and containing in a support from 2 to 3 wt % of titanium, based on the weight of the catalyst.

25 Claims, No Drawings

PRODUCTION OF POLYETHYLENE HAVING IMPACT RESISTANCE

BACKGROUND OF THE INVENTION

1. Field of the Invention

The present invention relates to a process for producing polyethylene having impact resistance and to a catalyst for use in such a process.

2. Description of the Prior Art

Polyethylene is known for use in the manufacture of a wide variety of articles. The polyethylene polymerization process can be varied in a number of respects to produce a wide variety of resultant polyethylene resins having different physical properties which render the various resins suitable for use in different applications. In particular, it is known to use polyethylene for use in applications where the polyethylene is required to have impact resistance. For example, polyethylene is known for use in the manufacture of pipes where it is obviously required that the material of the pipe has sufficient impact resistance so as to avoid inadvertent fracture in service. Furthermore, polyethylene is known for use as a film where the property of impact resistance of the film can be of importance.

Chromium-based catalysts used for the production of polyethylene have been known for some time. The catalysts may have been subjected to pre-treatment processes prior to the polymerization reaction. The pre-treatment processes may include chemical reduction of the chromium to a lower valence state, e.g. by carbon monoxide. Such a process is disclosed in, for example, EP-A-0591968.

U.S. Pat. No. 5,208,309 discloses a linear, very low density polyethylene polymerization process. In the polymerization process, a cocatalyst such as a boron alkyl, most particularly triethyl borane (TEB), is employed which tends to generate an in situ comonomer and thus depresses the density of the resultant polyethylene resin. The catalyst support is a silica-titania support and for producing a polymer with the most desirable characteristics it is preferred for the support to contain 5 to 8 wt % titanium. The specification does not address the problem of the production of polyethylene having impact resistance.

U.S. Pat. No. 4,151,122 discloses the reduction and reoxidation of a cogel or self-reduced catalyst in which oxidation of a catalyst is employed after reduction of a catalyst, such as by carbon monoxide, for boosting the melt index of the resultant polyethylene resin. There is no disclosure of a process for producing polyethylene having impact resistance.

U.S. Pat. No. 4,405,768 discloses the addition of titanium to a catalyst for boosting the melt index of the polyethylene resin. Again, there is no disclosure of a process for producing polyethylene having impact resistance.

EP-A-0000751 and its equivalent U.S. Pat. No. 4,180,481 disclose a process for the manufacture of a supported chromium oxide catalyst for olefin polymerization, the catalyst having been treated with carbon monoxide. There is no disclosure of a process for producing polyethylene having impact resistance.

SUMMARY OF THE INVENTION

The present invention aims in one aspect to provide a process for producing polyethylene having improved impact resistance.

It is known in the art that the physical properties, in particular the mechanical properties, of a polyethylene product vary depending on what catalytic system was employed to make the polyethylene. This is because different catalyst systems tend to yield different molecular weight distributions in the polyethylene produced. Thus, for example, the properties of a polyethylene product produced using a chromium-based catalyst (i.e. a catalyst known in the art as an "Phillips catalyst") tend to be different from the properties of a polyethylene produced using a different catalyst, for example a Ziegler-Natta catalyst. The production of polyethylene using a chromium-based catalyst is desirable to enable the particular polyethylene product obtainable thereby to be manufactured.

In a second aspect the present invention aims to provide a process for producing polyethylene having impact resistance using a chromium-based catalyst.

Accordingly, the present invention provides a process for producing polyethylene having impact resistance, the process comprising polymerizing ethylene, or copolymerizing ethylene and an alpha-olefinic comonomer comprising from 3 to 10 carbon atoms, in the presence of a chemically reduced chromium-based catalyst containing in a support thereof from 2 to 3 wt % of titanium, based on the weight of the catalyst.

DETAILED DESCRIPTION OF THE INVENTION

The present invention further provides a chromium-based catalyst for the production of polyethylene by polymerizing ethylene or copolymerizing ethylene and an alpha-olefinic comonomer comprising from 3 to 10 carbon atoms, the catalyst being chemically reduced and containing in a support from 2 to 3 wt % of titanium, based on the weight of the catalyst.

The present invention is predicated on the surprising discovery by the present inventor that the chemical reduction, preferably by carbon monoxide, of a chromium-based catalyst containing from 2 to 3 wt % titanium in its support can unexpectedly yield a polyethylene product having improved impact resistance.

The chromium-based catalyst preferably comprises a supported chromium oxide catalyst having a titania-containing support, for example a composite silica and titania support. A particularly preferred chromium-based catalyst may comprise from 0.5 to 5 wt % chromium, preferably around 1 wt % chromium, such as 0.9 wt % chromium based on the weight of the chromium-containing catalyst. The support comprises 2 to 3 wt % titanium, more preferably around 2.3 wt % titanium, based on the weight of the chromium containing catalyst. The chromium-based catalyst may have a specific surface area of from 200 to 700 $m^2/g$, preferably from 400 to 550 $m^2/g$ and a volume porosity of greater than 2 cc/g preferably from 2 to 3 cc/g.

A particularly preferred chromium-based catalyst for use in the present invention comprises a catalyst, ("catalyst 1") having an average pore radius of 190 Å, a pore volume of around 2.1 cc/g, a specific surface area of around 510 $m^2/g$ and a chromium content of around 0.9 wt % based on the weight of the chromium-containing catalyst. The support comprises a composite silica and titania support. The amount of titania in the support provides that the catalyst as a whole comprises around 2.3 wt % titanium.

The catalyst may be subjected to an initial activation step in air at an elevated activation temperature. The activation temperature preferably ranges from 500 to 850° C., more preferably 600 to 750° C., and is most particularly around 635° C.

The chromium-based catalyst is subjected to a chemical reduction process in which at least a portion of the chromium is reduced to a low valance state. Preferably, the chromium-based catalyst is reduced in an atmosphere of dry carbon monoxide at a temperature of from 250 to 500° C., more preferably 350 to 450° C., and most preferably at a temperature of around 370° C.

In the preferred polymerization process of the present invention, the polymerization or copolymerization process is carried out in the liquid phase, the liquid comprising ethylene, and where required an alpha-olefinic comonomer comprising from 3 to 10 carbon atoms, in an inert diluent. The comonomer may be selected from 1-butene, 1-pentene, 1-hexene, 4-methyl 1-pentene, 1-heptene and 1-octene. The inert diluent is preferably isobutane. The polymerization or copolymerization process is typically carried out at a temperature of from 90 to 100° C., more preferably from 95 to 100° C., and at a pressure of 20 to 42 bars, more preferably at a minimum pressure of around 24 bars.

Typically, in the polymerization process, the ethylene monomer comprises from 0.5 to 8% by weight, typically around 6% by weight, of the total weight of the ethylene in the inert diluent. Typically, in the copolymerization process, the ethylene monomer comprises from 0.5 to 6% by weight and the comonomer comprises from 0.5 to 3% by weight, each based on the total weight of the ethylene monomer and comonomer in the inert diluent.

The carbon monoxide-reduced catalyst for use in the process of the invention is introduced into the polymerization reactor. The alkylene monomer, and comonomer if present, are fed into the polymerization reactor in the inert diluent and the polymerization product of polyethylene is discharged from the reactor and separated from the diluent which can then be recycled.

In accordance with the preferred process of the invention, in order to achieve good impact resistance for the polyethylene, the process is performed in order to achieve high density in the polyethylene. Accordingly, the process is carried out in the absence of a cocatalyst such as triethyl borane (TEB) which would tend to depress the density, and thus lower the impact resistance. Preferably, the polyethylene has a density of from 0.940 to 0.950 g/cc and a high load melt index (HLMI) for resins within that density range of from 5 to 12 g/10 min. Preferably, the polyethylene resin has a shear response (SR) of less than 80.

The process of the present invention can provide polyethylene resins having improved impact resistance. In particular, when the polyethylene resins are used to manufacture films, which are produced by blowing or extrusion, the impact resistance of the film as measured by impact of a dart can be significantly improved as compared to the use of an equivalent catalyst which has not been subjected to carbon monoxide reduction. When the polyethylene resins are used to produce pipes, the impact resistance of the pipe under pressure can be greatly increased as compared to the impact resistance of an equivalent pipe employing a polyethylene resin prepared by a polymerization process using substantially the same chromium-based catalyst but not subjected to carbon monoxide reduction.

The present invention will now be described with reference to the following non-limiting Example.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

In Example 1, a polyethylene resin was produced by the polymerization process of the present invention in which a carbon monoxide-reduced chromium-based catalyst was employed. The catalyst employed in Example 1 was the chromium-based catalyst identified as catalyst 1 above which had been activated in dry air at a temperature of around 635° C. and then subjected to a dry carbon monoxide reduction at a temperature of 370° C. The catalyst had a pore volume of 2.1 cc/g and a specific surface area of 510 m$^2$/g. The catalyst comprised 0.9% Cr and 2.3% Ti, each based on the weight of the catalyst. In Example 1, a liquid comprising 6.4 wt % ethylene, 0.6 wt % 1-hexene and the balance isobutane as an inert diluent was fed into a polymerization reaction zone at a pressure of 42 bars and at a polymerization temperature of 95° C. The catalyst was also fed into the polymerization reaction zone. The resultant polyethylene resin was separated from the diluent and following processing to form pellets, the physical properties of the resultant resin were measured. These are shown in Table 1.

TABLE 1

| CATALYST | EXAMPLE 1 CO REDUCED CATALYST 1 | COMPARATIVE EXAMPLE 1 CATALYST 1 | COMPARATIVE EXAMPLE 2 CO REDUCED CATALYST 2 | COMPARATIVE EXAMPLE 3 CO REDUCED CATALYST 3 |
|---|---|---|---|---|
| Pore Volume (cc/g) | 2.1 | 2.1 | 2.1 | 2.1 |
| Surface Area (m$^2$/g) | 510 | 510 | 420 | 510 |
| Wt % Cr | 0.9 | 0.9 | 0.9 | 0.9 |
| Wt % Ti | 2.3 | 2.3 | 1.45 | 5.0 |
| Activation Temp. (° C.) | 635 | 635 | 635 | 600 |
| CO Reduction Temp. (° C.) | 370 | — | 370 | 370 |
| RESIN | | | | |
| HLMI (g/10) | 8.5 | 9.6 | 10.0 | 8.0 |
| SR | 68 | 90 | 101 | 90 |
| Density (g/cc) | 0.946 | 0.946 | 0.947 | 0.947 |
| PIPE APPLICATION Pc S4/0° C. (bar) | | | | |
| 110 mm Diameter | >12 | 2.5 | — | — |
| FILM APPLICATION Impact Resistance dart (g) | | | | |
| 10 μm | 131 | 80 | <30 | 63 |
| 20 μm | 155 | — | 47 | 87 |

As may be seen from Table 1, the resultant resin had a high load melt index (HLMI) of 8.5 g/10, the high load melt index having been determined using the procedures of ASTM D 1238 using a load of 21.6 kg at a temperature of 190° C. The melt index ($MI_2$) was similarly measured (using the same procedures, with a load of 2.16 kg at 190° C.) and the ratio $HMLI/MI_2$ was calculated to yield a value for the shear response (SR) of the polyethylene resin of Example 1 of 68. The density of the polyethylene resin was measured as 0.946 g/cc, as shown in Table 1.

The polyethylene resin was then formed into a pipe having a diameter of 110 mm. The pipe was then subjected to an impact resistance test at 0° C. by subjecting the pipe to internal pressurization. This test known as the RCP 54 test, was in accordance with ISO/DIS 13477 or EN33477. It will be seen from Table 1 that the pipe failed at an internal pressurization of greater than 12 bars.

The polyethylene resin was also formed into a 10 micron and a 20 micron thick film, each of which was then subjected to impact by a weighted dart. This test was in accordance with ASTM 1709 Method A. It will be seen from Table 1 that the 10 micron film was penetrated by a dart having a weight of 131 grams and that the 20 micron film was penetrated by a dart having a weight of 155 grams.

COMPARATIVE EXAMPLE 1

Table 1 also shows equivalent processing parameters and properties of the resin, pipe and film of the polyethylene resin produced in accordance with Comparative Example 1 in which the same chromium-based catalyst as in Example 1 was employed in the production of a polyethylene resin, but with the catalyst having not been subjected to a carbon monoxide reduction.

It will be seen that the density of the resin of Comparative Example 1 is the same as that of Example 1, but that the melt index and the shear response have greater values that the corresponding values of Example 1. Most importantly, the impact resistance of both the pipe and the film were significantly reduced as compared to the corresponding properties of pipe and film made from the resin produced in accordance with Example 1. The pipe failed at an internal pressurization of 2.5 bars and the 10 micron film was penetrated by an 80 gram dart.

It will thus been seen that in accordance with the present invention, the use of carbon monoxide reduction of a chromium-based catalyst having a titanium-containing support can give improved impact resistance performance to the resultant polyethylene resin.

COMPARATIVE EXAMPLE 2

Table 1 further shows equivalent processing parameters and properties of the resin and film of the polyethylene resin produced in accordance with Comparative Example 2 in which the catalyst employed was a carbon monoxide-reduced chromium-based catalyst having a low titanium content in the support. The catalyst employed was a catalyst, identified as "catalyst 2" having a pore volume of 2.1 cc/g and a specific surface area of 420 m²/g. The catalyst contained 0.9% Cr but only 1.45% Ti, each based on the weight of the catalyst. The catalyst, as for Example 1, was activated at around 635° C. and then subjected to a dry carbon monoxide reduction at a temperature of 370° C.

The resultant polyethylene was, as for Example 1, formed into 10 micron and 20 micron films and subjected to the same impact tests as for Example 1. It will be seen from Table 1 that the films of Comparative Example 2 had significantly lower film impact resistance than those of Example 1, the 10 and 20 micron films being penetrated by darts of less than 30 g and 47 g respectively. The results of Example 1 and Comparative Example 2 show that the use, in conjunction with carbon monoxide reduction, of a catalyst support having a titanium content of at least 2% provides improved impact resistance to the polyethylene.

COMPARATIVE EXAMPLE 3

In this Comparative Example, a different catalyst, catalyst 3, was employed having the properties specified in Table 1. The catalyst was subjected to zero reduction and activation similar to those for Comparative Example 2 but using the temperatures specified in Table 1. The resultant resin had the properties HLMI, shear response and density as specified in Table 1. A film produced from the resultant resin was tested for impact resistance as for the previous Comparative Examples and the results are shown in Table 1. It may be seen that the use of a catalyst having a titanium content of 5% by weight, i.e. greater than the 3% limit required by the present invention, yields reduced impact resistance as compared to the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of United States of America is:

1. A process for producing polyethylene having impact resistance, the process comprising polymerizing ethylene, or copolymerizing ethylene and an alpha-olefinic comonomer comprising from 3 to 10 carbon atoms, in the presence of a chemically reduced chromium-based catalyst containing in a support thereof from 2 to 3 wt % of titanium, based on the weight of the catalyst, and in the absence of a cocatalyst wherein the polyethylene has a high load melt index (HLMI) of from 5 to 12 g/10 min and a density of from 0.940 to 0.950 g/cc.

2. A process according to claim 1 wherein the support is a silica-titania support.

3. A process according to claim 1 wherein the carbon monoxide reduction has been performed at a temperature of from 250 to 500° C.

4. A process according to claim 2 wherein the carbon monoxide reduction has been performed at a temperature of from 250 to 500° C.

5. A process according to claim 3 wherein the carbon monoxide reduction has been performed at a temperature of around 370° C.

6. A process according to claim 4 wherein the carbon monoxide reduction has been performed at a temperature of around 370° C.

7. A process according to claim 1 wherein the support contains around 2.3 wt % titanium, based on the weight of the catalyst.

8. A process according to claim 2 wherein the support contains around 2.3 wt % titanium, based on the weight of the catalyst.

9. A process according to claim 3 wherein the support contains around 2.3 wt % titanium, based on the weight of the catalyst.

10. A process according to claim 4 wherein the support contains around 2.3 wt % titanium, based on the weight of the catalyst.

11. A process according to claim 5 wherein the support contains around 2.3 wt % titanium, based on the weight of the catalyst.

12. A process according to claim 6 wherein the support contains around 2.3 wt % titanium, based on the weight of the catalyst.

13. A process according to claim 1 wherein the catalyst has a pore volume of around 2.1 cc/g and a specific surface area of around 510 m$^2$/g.

14. A process according to claim 2 wherein the catalyst has a pore volume of around 2.1 cc/g and a specific surface area of around 510 m$^2$/g.

15. A process according to claim 3 wherein the catalyst has a pore volume of around 2.1 cc/g and a specific surface area of around 510 m$^2$/g.

16. A process according to claim 4 wherein the catalyst has a pore volume of around 2.1 cc/g and a specific surface area of around 510 m$^2$/g.

17. A process according to claim 5 wherein the catalyst has a pore volume of around 2.1 cc/g and a specific surface area of around 510 m$^2$/g.

18. A process according to claim 6 wherein the catalyst has a pore volume of around 2.1 cc/g and a specific surface area of around 510 m$^2$/g.

19. A process according to claim 7 wherein the catalyst has a pore volume of around 2.1 cc/g and a specific surface area of around 510 m$^2$/g.

20. A process according to claim 8 wherein the catalyst has a pore volume of around 2.1 cc/g and a specific surface area of around 510 m$^2$/g.

21. A process according to claim 9 wherein the catalyst has a pore volume of around 2.1 cc/g and a specific surface area of around 510 m$^2$/g.

22. A process according to claim 10 wherein the catalyst has a pore volume of around 2.1 cc/g and a specific surface area of around 510 m$^2$/g.

23. A process according to claim 11 wherein the catalyst has a pore volume of around 2.1 cc/g and a specific surface area of around 510 m$^2$/g.

24. A process according to claim 12 wherein the catalyst has a pore volume of around 2.1 cc/g and a specific surface area of around 510 m$^2$/g.

25. A process according to claim 1 wherein the polyethylene has a shear response (SR) less than 80.

* * * * *